Figure 1:
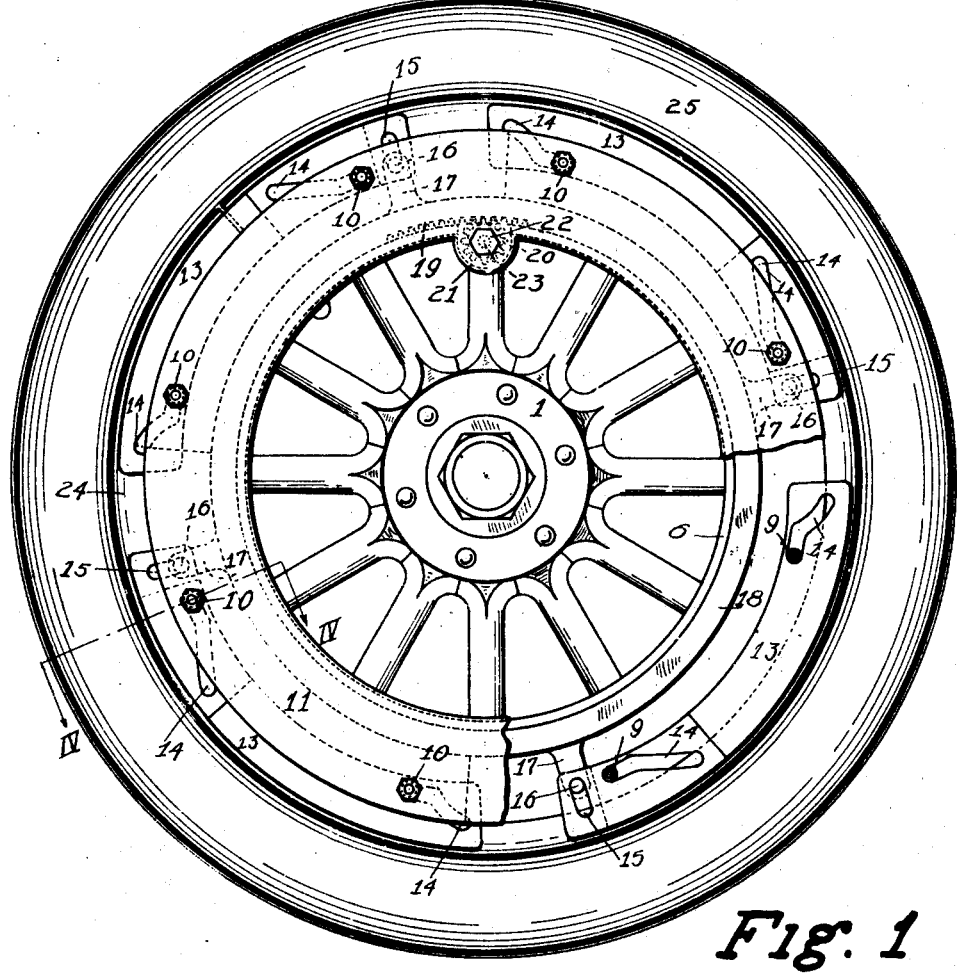

Feb. 28, 1928.

H. F. FREASE

VEHICLE WHEEL

Filed Nov. 15, 1920

1,661,117

3 Sheets-Sheet 1

INVENTOR

Feb. 28, 1928.

H. F. FREASE

VEHICLE WHEEL

Filed Nov. 15, 1920

1,661,117

3 Sheets-Sheet 2

INVENTOR

Feb. 28, 1928.

H. F. FREASE

VEHICLE WHEEL

Filed Nov. 15, 1920

1,661,117

3 Sheets-Sheet 3

INVENTOR

Hurxthal Field Frease

Patented Feb. 28, 1928.

1,661,117

UNITED STATES PATENT OFFICE.

HURXTHAL FIELD FREASE, OF CANTON, OHIO, ASSIGNOR OF ONE-HALF TO SHERMAN REESE HOYT, OF NEW YORK, N. Y.

VEHICLE WHEEL.

Application filed November 15, 1920. Serial No. 424,217.

The invention relates to vehicle wheels, more particularly to automobile wheels provided with resilient or pneumatic tires whether or not in conjunction with demountable rims; and the object of the improvement is to provide a simple, positively controlled mechanism for retaining removable annuli such as tires or rims to wheels, which may be actuated easily and quickly from a single point of application of manual power.

Pneumatic tires not provided with demountable rims are usually of the clincher or straight side types. From the point of view of convenience in changing either of these types of tires, a device in common use for retaining a tire to a wheel is a split annulus seated in a peripheral channel at one side of the felly of the wheel; the other side of the felly having a flange with a peripheral diameter equal to the external diameter of the retaining annulus, and greater than the external diameter of the felly proper.

When it is desired to remove a tire from a wheel of this character, the retaining annulus must be unseated and taken off, necessitating awkward time-consuming manipulation with a screw-driver or other prying means, because the retaining annulus must be distorted and strained out of its natural shape and exerts forces opposing the prying efforts to unseat it. On replacing the tire difficulties of a similar nature are encountered.

On the other hand, a tire mounted on one of the ordinary forms of demountable rims, usually clamped on the wheel by a plurality of wedges and draw-bolts, forms a combination also difficult of removal from the wheel, or replacement thereon. The wedges and draw-bolts require a like number of separate and distinct manual operations; and, furthermore, the wedges and nuts of the draw-bolts may be easily lost on changing a tire under ordinary road conditions. When replacing the wedges and nuts, it is also common experience that considerable time is consumed adjusting the wedges so that they will properly draw up and clamp the rim to the wheels.

These difficulties are overcome, and the time required to change a tire, or tire and rim, is materially reduced by the present invention, which consists in the use of tapered arcuate retaining wedge plates having cam slots operating on guide bolts in an annular channel at one side of the wheel felly; the tapered arcuate wedge plates being actuated circumferentially and centrifugally or centripetally by radial lugs on a rotating ring slidably mounted in the annular channel, and the ring being geared to a pinion; and the whole device being operable by the rotation of the pinion, thus forming, in effect, a positively controlled peripheral retaining mechanism movable centrifugally, centripetally and circumferentially.

A preferred embodiment and use of the invention is illustrated in the accompanying drawings forming a part hereof, in which—

Figure 2:
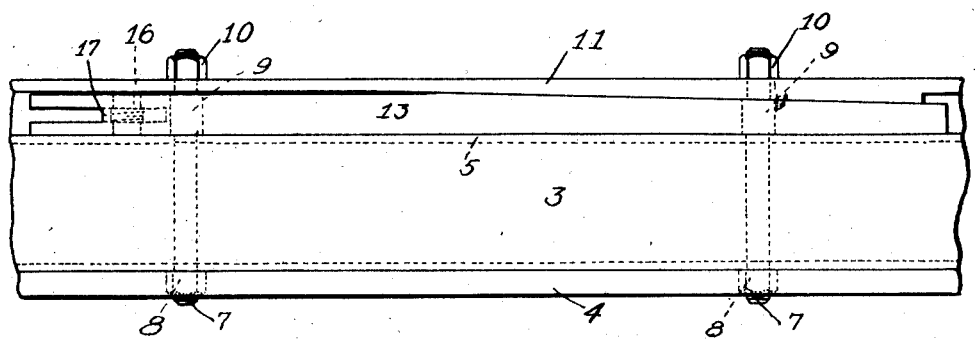
Figure 3:
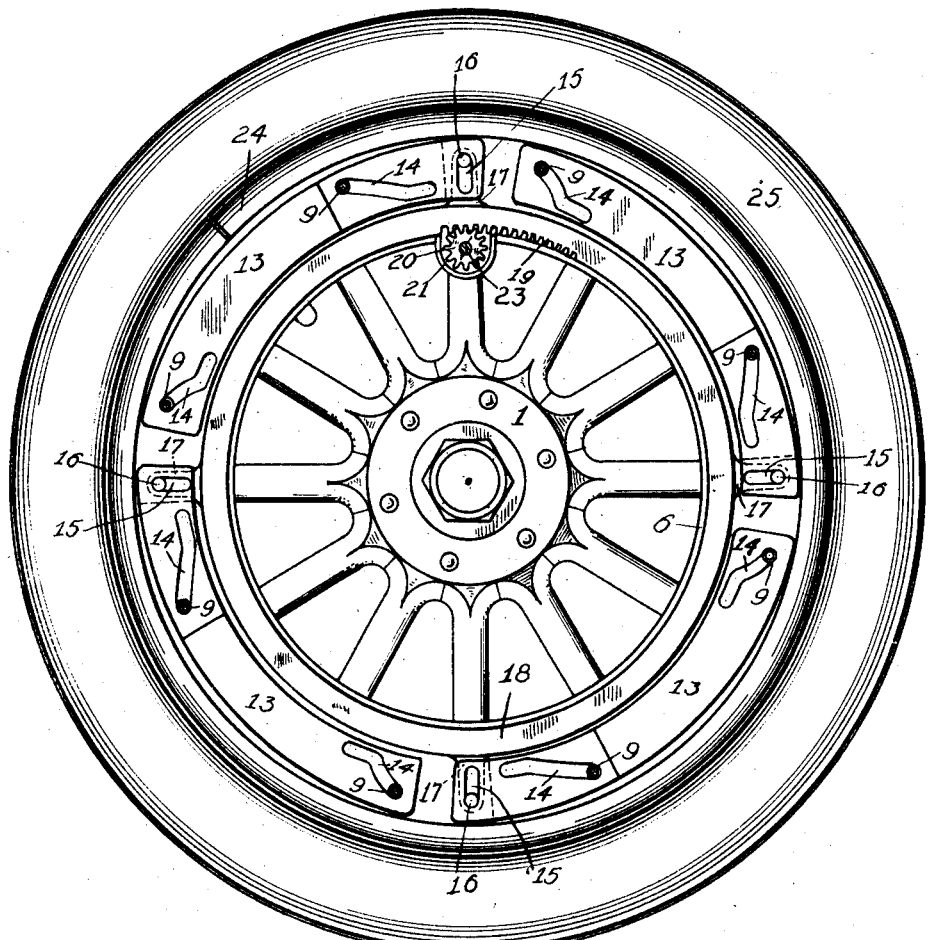
Figure 5:
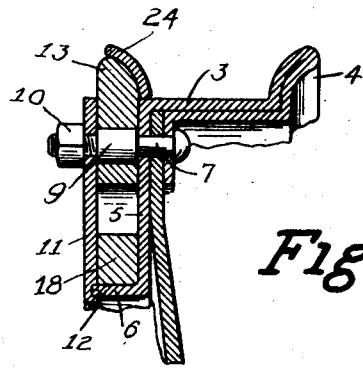
Figure 4:
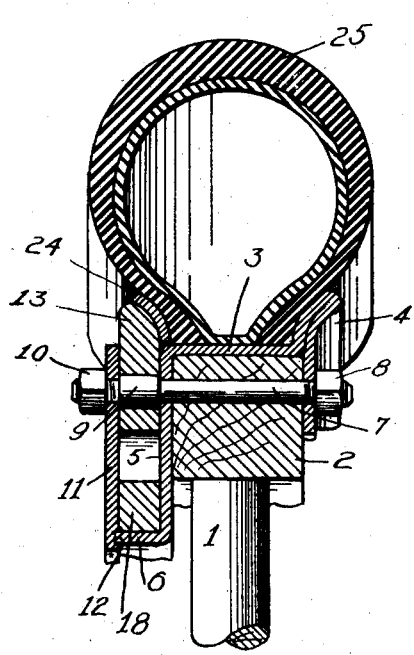
Figure 6:
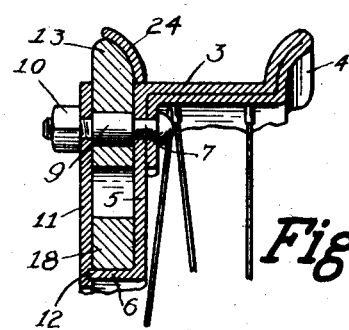
Figure 7:
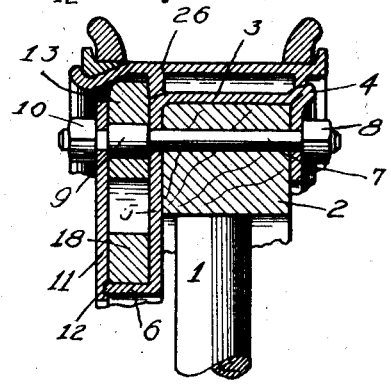
Figure 8:
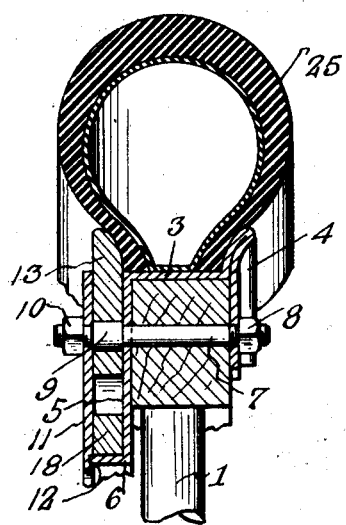

Figure 1 is a side elevation of a wheel equipped with the device, a fragment of the outer channel wall being removed, and the tapered arcuate wedge plates being in expanded position for retaining the tire on the wheel;

Fig. 2, a fragmentary plan projection of one of the tapered arcuate wedge plates and the wheel without the tire;

Fig. 3, a side elevation of a wheel equipped with the device, the outer channel wall being entirely removed, and the tapered arcuate wedge plates being in contracted position ready for the removal of the tire;

Fig. 4, a fragmentary cross-section on line IV—IV, Fig. 1;

Fig. 5, a fragmentary cross-section of the device as applied to a disk steel wheel;

Fig. 6, a fragmentary cross-section of the device as applied to a wire wheel;

Fig. 7, a fragmentary cross-section of the device used with a demountable rim, showing a form of wedge segment modified for this purpose; and Fig. 8, a fragmentary cross-section of the device for use without a split annulus.

Similar numerals refer to similar parts throughout the drawings.

The wheel 1 is provided with the usual wood felly 2 and re-inforced with the metal felly band 3, which is bent to form the flange 4, the channel side wall 5, and the channel bottom wall 6, and which is secured to the wood felly 2 by means of the guide bolts 7 and nuts 8.

The guide bolts 7 are preferably so formed that the cam-guides 9 are of greater diameter than the bolts proper; and, therefore, in addition to being cam-guides, act also as bolt heads for nuts 8 and 10, and as spacers for the removable outer channel wall 11 which completes the formation of the channel. Nuts 10 secure the outer channel wall 11 in position, the annular recess 12 in the outer channel wall 11 receiving the edge of the channel bottom wall 6.

The tapered arcuate wedge plates 13 contains cam-slots 14 and ride on the cam-guides 9, and operate in the annular channel formed by channel side wall 5, channel bottom wall 6, and outer channel wall 11.

Radial slots 15 in one end of each tapered arcuate wedge plate 13 receive pins 16 in the radial lugs 17 of the ring 18 which rotates on the channel bottom wall 6 and is geared at 19 to the pinion 20.

The pinion 20 is mounted in a suitable bearing extension 21 of the outer channel wall, side wall and bottom wall; and this pinion has an external polygonal head 22 on the prolongation of the axis 23, which head may be rotated by any appropriate tool such as a wrench.

A split annulus 24 may be provided to equalize the pressure of the wedge segments against the sides of the tire 25; it being understood, however, that the wedge segments may operate directly against the side of the tire; as illustrated in Fig. 8.

In Figs. 1 and 4, the wheel is shown with the tire held in place by the tapered arcuate wedge plates 13 in expanded and wedged position, and opposed to flange 4. It can easily be seen that a rotation of the head 22 in a clock-wise direction will rotate the ring 18 clock-wise, and will exert, through the lugs 17 and the pins 16, a tangential force in the clock-wise direction on the wedge plates 13, which have been previously wedged in the expanded position. The design of the cam slots 14 in the wedge plates 13 is of such nature that the tangential force exerted as a resultant of the clock-wise rotation of the head 22, first releases the wedge segments from their wedged positions by a circumferential movement without changing their radial distance from the center of the wheel, and then withdraws the segments centripetally by a centripetal-circumferential movement to the contracted position shown in Fig. 3. The split annulus 24 and the tire 25 now may be easily and quickly removed. The total time required to remove the tire is thus only that required to turn the head 22 until the tapered arcuate wedge plates 13 are released and centripetally contracted, and then to slip off the split annulus and the tire.

Obviously, to replace the tire requires only the reverse of these operations; and the turning of the head 22 counter clock-wise, first centrifugally expands the wedge segments 13 by a centripetal-circumferential movement thereof; and finally, forces the segments home by a circumferential movement and clamps the tire in position.

It may be seen from Fig. 2, that the inner side face of each tapered arcuate wedge plate is parallel to the opposing face of the channel side wall 5, and that the inner face of the removable outer channel wall 11 conforms to the opposing face of each tapered arcuate wedge plate, the same being tapered endwise in at least a portion of its arcuate length, so that the thickness of each of these tapered arcuate wedge plates is greater at one end than at the other, the inner face of the outer channel wall being correspondingly arcuately tapered to wedge the plate when circumferentially operated.

Another peculiarity of these tapered arcuate wedge plates consists in the fact that the inner and outer circumferential faces of the plates are not described from the same center; so that the faces will respectively conform to the periphery of the ring 18 when contracted, and with the periphery of the felly band flange 4 when expanded, as shown in Figs. 3 and 1 respectively.

Figs. 4 and 5 illustrate the adaptability of this device to disk or wire wheels, while Fig. 7 shows that by a slight variation in the geometric cross-section of the tapered arcuate wedge plates 13 and of the metal felly band 3, the device may be used with a demountable rim, such as 26.

I claim:

1. A wheel, a laterally removable annulus on the periphery of the wheel, and means for retaining the annulus on the wheel including an arcuately tapered wedge plate movably mounted on the one for lateral engagement and disengagement with the other.

2. A wheel, a laterally removable annulus on the periphery of the wheel, and means for retaining the annulus on the wheel including an arcuately tapered wedge plate movably mounted on the one for lateral wedge engagement and disengagement with the other.

3. A wheel, a laterally removable annulus on the periphery of the wheel, and means for retaining the annulus on the wheel including an arcuately tapered wedge plate movably mounted on the wheel for lateral engagement and disengagement with the annulus.

4. A wheel, a laterally removable annulus on the periphery of the wheel and means for retaining the annulus on the wheel including a plurality of arcuately tapered wedge plates movably mounted on the one for lateral engagement and disengagement with the other.

5. A wheel, a laterally removable annulus on the periphery of the wheel and means for retaining the annulus on the wheel including a circumferentially movable arcuately tapered wedge plate mounted on the one for arcuate wedge engagement and disengagement with the other.

6. A wheel, a laterally removable annulus on the periphery of the wheel, and means for retaining the annulus on the wheel including an annular channel in the one, and arcuately tapered plates movably mounted in the channel for lateral engagement and disengagement with the other by circumferential movements in the channel.

7. A wheel, a laterally removable annulus on the periphery of the wheel, and means for retaining the annulus on the wheel including an arcuately tapered wedge plate movably mounted on the one for lateral engagement and disengagement with the other, and mechanism for moving the wedge plate.

8. A wheel, a laterally removable annulus on the periphery of the wheel, and means for retaining the annulus on the wheel including a tapered arcuate wedge plate operatively mounted on the one for lateral engagement and disengagement with the other, the circumferential edges of the plate being described from different centers.

9. A wheel, a laterally removable annulus on the periphery of the wheel, and means for retaining the annulus on the wheel including an annular channel in the one and a tapered arcuate wedge plate operatively mounted for circumferential movement in the channel for lateral engagement and disengagement with the other, the plate being arcuately tapered, and the walls of the channel conforming to the plate.

10. A wheel, a laterally removable annulus on the periphery of the wheel, and means for retaining the annulus on the wheel including an annular channel in the one and a tapered arcuate wedge plate operatively mounted for circumferential movement in the channel for lateral engagement and disengagement with the other, the plate being arcuately tapered through a portion of its arcuate length, and the walls of the channel conforming to the plate.

11. A wheel, a laterally removable annulus on the periphery of the wheel, and means for retaining the annulus on the wheel including walls forming an annular channel in the one, an arcuately tapered wedge plate having cam slots movably mounted in the channel for lateral engagement and disengagement with the other, and guide bolts for the cam slots, there being enlarged heads on the bolts for spacing the walls of the channel and nuts on the bolt ends for securing them to the wheel.

HURXTHAL FIELD FREASE.